Jan. 13, 1942.  C. F. VAN HOOK  2,270,093
RETRACTING PINTLE CRADLE FOR STRANDING AND/OR CLOSING MACHINES
Filed Jan. 23, 1941  2 Sheets-Sheet 1

INVENTOR
Charles F. Van Hook
BY
ATTORNEYS

Jan. 13, 1942. C. F. VAN HOOK 2,270,093
RETRACTING PINTLE CRADLE FOR STRANDING AND/OR CLOSING MACHINES
Filed Jan. 23, 1941 2 Sheets-Sheet 2

INVENTOR
Charles F. Van Hook
BY
Synnestvedt & Lechner
ATTORNEYS

Patented Jan. 13, 1942

2,270,093

UNITED STATES PATENT OFFICE 2,270,093

RETRACTING PINTLE CRADLE FOR STRANDING AND/OR CLOSING MACHINES

Charles F. Van Hook, Warren Point, N. J.

Application January 23, 1941, Serial No. 375,608

6 Claims. (Cl. 242—134)

This invention relates to planetary stranding, cabling and/or closing machines, and particularly to certain improvements in the spool supporting structure of such machines.

The primary objects of the invention are to provide a spool supporting mechanism in the cradle which is of greatly simplified and less expensive construction; to provide a support which equalizes the friction in any rotational position of the cradle; to simplify removal or replacement of a spool; to provide a construction which permits better dynamic balancing of the cradle in all positions of the main rotor; to enable quicker loading and unloading of the spools in the cradles; to prevent side slap of the spool in the cradle; and, in general, to improve the operation, increase the efficiency and lower the manufacturing and maintenance costs of devices of this kind.

How the foregoing objects, together with such other objects as may appear hereinafter or are incident to my invention, are attained is illustrated in preferred embodiments in the accompanying drawings, wherein—

Figure 1:
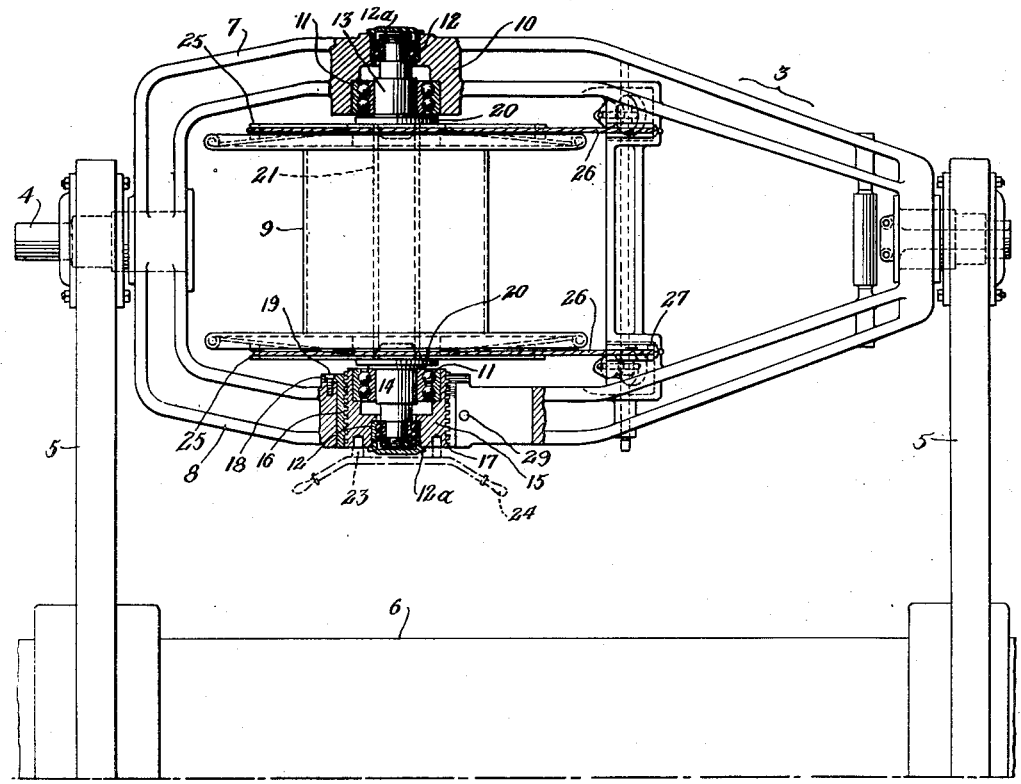
Figure 1 is a plan view of the cradle and spool of a planetary stranding and closing machine with my improved spool mounting mechanism shown in section.
Figure 2:
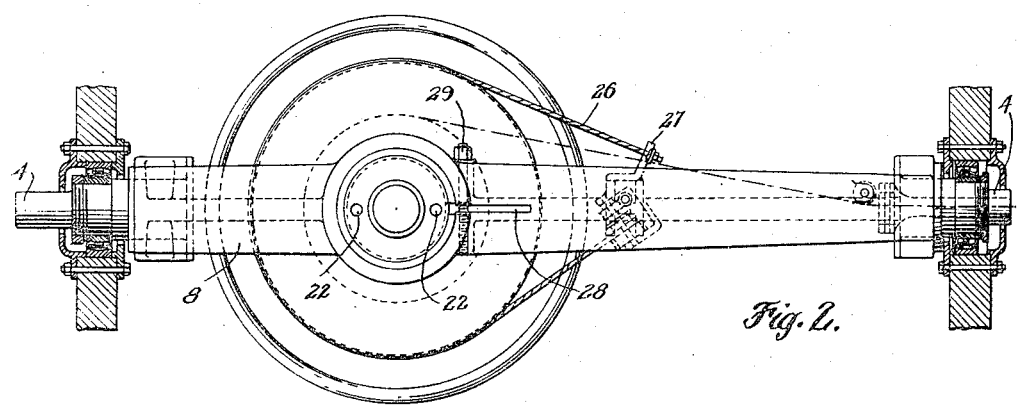
Figure 2 is a side elevation of the device of Figure 1 with the cradle mountings shown in section.

In Figures 1 and 2 is illustrated a cradle 3 suitably mounted upon trunnions 4 between the heads 5 of the main rotor 6. The cradle is of the flat type, and between its side members 7 and 8 is mounted a spool 9 by means of the mechanism now to be described.

In the side member 7 is formed a suitable housing 10 for the anti-friction bearings 11 and 12, in which bearings is rotatably mounted a pintle 13. Directly opposed to the pint'e 13 is another pintle 14 carried in the side member 8. This pintle is also provided with anti-friction bearings 11 and 12, but in this instance the bearings are mounted in a housing 15 which is adjustable in the nut member 16 by virtue of the threads 17. The nut 16 is provided with a flange 18 through which screws 19 extend for the purpose of securely fastening the nut in its aperture in the side member 8, as clearly shown in Figure 1. Each bearing 12 is provided with a cap plate or cover 12a which is threaded into the housing.

Each pintle is provided with a spool embracing flange 20 between which is clamped the spool 9, the inner ends of the pintles projecting slightly into the hollow hub 21 of the spool.

The outer face of the bearing housing 15 is provided with a pair of oppositely disposed openings 22 into which are adapted to project the pins 23 of a tool or wrench 24, by means of which wrench the housing 15 can be advanced or retracted by rotation thereof in the threads 17.

In the position shown in Figure 1, the spool is clamped snugly between the members 20, and it will be seen that side slap of the spool is completely eliminated and that any adjustment, within reason, can be made by adjusting the position of the housing 15. When removing a spool, all that it is necessary to do is to apply the wrench 24 and retract the housing 15 which takes with it the pintle 14 and its anti-friction bearings 11 and 12. The degree of retraction can be sufficient to free the spool from both of the pintles 13 and 14, whereupon the spool can be lifted out, preferably by suitable overhead hoisting mechanism operated from the ceiling of the plant.

At each side the spool is equipped with a brake drum or friction pulley 25 around which extends the brake band 26, one end of which can be slipped out of the forked supports 27 on the side members of the cradle at times when removing or replacing a spool.

While not absolutely essential, I prefer to form the side member 8 with a split or slot 28 at one side of the bearing housing 15. Through this slot is passed the screw or bolt 29 by means of which the housing can be tightly clamped in any desired position of adjustment. Where this arrangement is adopted it is necessary, of course, that the nut 16 be a split nut, as shown, in order to permit the necessary clamping action.

It is obvious, of course, that the bearing housing 15 could be threaded directly into the side member 8 if so desired, but I prefer the construction illustrated because it makes possible ready renewal of the nut when wear of the threads occurs.

Figure 3:
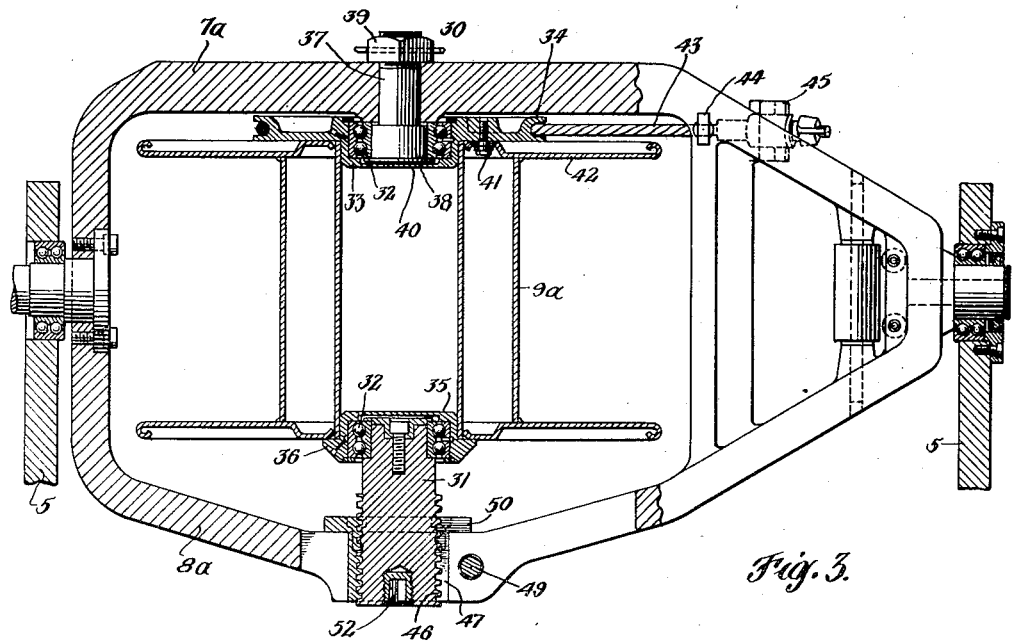
Figure 3 is a view similar to that of Figure 1 but illustrating another type of spool mounting.
Figure 4:
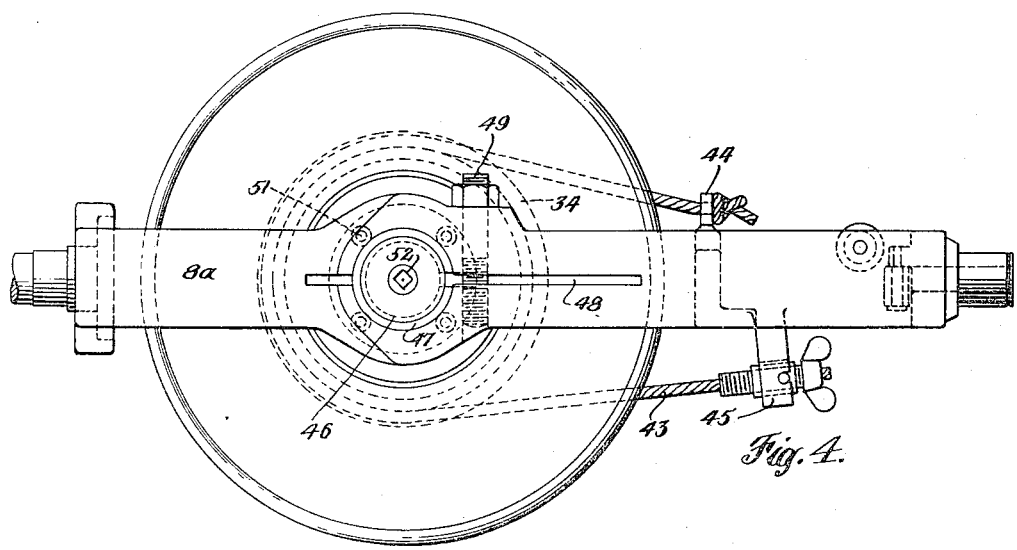
Figure 4 is a side view of the construction of Figure 3.

In the embodiment of Figures 3 and 4, the pintles 30 and 31 in the side members 7a and 8a of the cradle do not rotate as they do in the embodiment of Figures 1 and 2, but mounted on each pintle is an anti-friction bearing 32 upon which rotates the spool 9a, the central opening of which spool embraces the hub 33 of a friction pulley 34 at one end and the hub 35 of a bearing housing 36 at the other end.

The pintle 30 has a shank portion 37 which projects through the member 7a and an enlarged head or bearing supporting portion 38. It is inserted from the inside of the cradle and held in place by the nut 39. At its inner end it has a flanged bearing retaining portion 40. The friction pulley 34 is provided with a stud 41 which projects into an aperture in the side 42 of the spool, whereby the spool and the pulley rotate together. Around the pulley is a friction cable 43 the ends of which are suitably secured in the lugs 44 and 45 which project from the frame of the cradle, as shown to best advantage in Figure 4.

The pintle 31 is provided with the threads 46 by means of which it is screwed into the split nut 47, the latter corresponding to the split nut 16 in Figure 1. The side member 8a is slotted as at 48 so that the pintle may be firmly clamped in its properly adjusted position by means of the threaded bolt 49. The nut has a flange 50 by means of which it is secured to the inside of the member 8a by a series of screws 51. At its outer end the pintle 31 is provided with a socket 52 to which can be applied a suitable operating wrench (not shown).

The pintle 31 can be retracted sufficiently far to free the spool 9a from both the hub 33 and the hub 35, whereupon it can be lifted out and replaced with another, the side 42 of the spool being pulled clear of the stud 41 during this operation. Thus it will be seen that in this embodiment the friction pulley 34 is entirely independent of the spool 9a and does not move with it when replacement is necessary.

It will be readily appreciated that in either embodiment my improved spool support is exceedingly simple in construction and that removal or replacement of a spool can be quickly accomplished with unskilled labor simply by retracting one of the two pintles upon which it is mounted. The full anti-friction mounting reduces wear to a minimum so that the structure is always well balanced and there is no undue load placed upon the rotor as a whole. There are no loose parts to remove or replace when a spool is loaded or removed from the cradle, a single wrench serving all of the cradles of any machine.

By clamping the retractable pintle firmly in position in the side member of the cradle as by the threaded bolts 29 and 49 acting upon the slots 28 and 48, it is possible to prevent undue wear upon the threads which, of course, minimizes the danger of looseness and side slap of the spool. The removable nut is, actually, an integral part of the cradle when in its operative position, but it permits of ready replacement when wear occurs.

I claim:

1. In a machine of the character described, the combination of a spool cradle, an anti-friction pintle for rotatably supporting one side of said spool, and a pintle housing threaded into the cradle, said pintle being adapted to move with the housing.

2. In a machine of the character described, the combination of a spool cradle, an anti-friction pintle for rotatably supporting one side of said spool, and a pintle housing threaded into the cradle, said pintle being adapted to move with the housing, together with means for clamping the housing in a fixed position.

3. In a machine of the character described, the combination of a spool cradle, an anti-friction pintle for rotatably supporting one side of said spool, a nut fixed in an aperture in the cradle, and a pintle housing threaded into said nut, said pintle being adapted to move with the housing, and the cradle and the nut each being provided with a clamping slot, together with means for pinching said slots to clamp the housing in a fixed position.

4. In a machine of the character described, the combination of a spool cradle, pintle means for rotatably supporting a spool comprising a pair of opposed pintle members carried by said cradle, means for securing one of said pintle members against lateral movement, means for threadably mounting the other pintle member, an anti-friction bearing on said first pintle member, a friction pulley carried on said bearing, an anti-friction bearing on said second pintle member, a spool supported by and between said bearings and adapted to rotate with said friction pulley, a clamping slot in the cradle for said threadably mounted pintle member, and means for pinching the slot to clamp said threadably mounted pintle in a fixed position.

5. A rotatable spool cradle for the rotor of a machine of the character described, said cradle having opposed anti-friction pintle means for rotatably supporting the spool upon an axis at right angles to the cradle axis, one of said pintle means being threadably mounted in a side of the cradle whereby it can be advanced toward or retracted from the spool, and means for clamping said threads to hold said threadably mounted pintle means in its adjusted position.

6. In a machine of the character described, the combination of a spool cradle, pintle means for rotatably supporting a spool comprising a pair of opposed pintle members carried by said cradle, means for securing one of said pintle members against lateral movement, means for threadably mounting the other pintle member, anti-friction bearing means on each of said pintle members, a spool supported by and between said bearing means, a friction pulley adapted to rotate with said spool, and means for clamping said threads to hold said threadably mounted pintle in a fixed position.

CHARLES F. VAN HOOK.